US011659395B2

(12) United States Patent
Vivanco et al.

(10) Patent No.: US 11,659,395 B2
(45) Date of Patent: May 23, 2023

(54) SYSTEM AND METHOD FOR AVOIDING SIGNAL SPOOFING ATTACKS IN WIRELESS BROADBAND NETWORKS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); Tyann Lavender, Lithia Springs, GA (US); Thomas W. Henderson, Alpharetta, GA (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 0 days.

(21) Appl. No.: 17/360,416

(22) Filed: Jun. 28, 2021

(65) Prior Publication Data
US 2021/0329458 A1  Oct. 21, 2021

Related U.S. Application Data

(63) Continuation of application No. 16/534,251, filed on Aug. 7, 2019, now Pat. No. 11,082,853.

(51) Int. Cl.
*H04W 12/12* (2021.01)
*H04W 64/00* (2009.01)
(Continued)

(52) U.S. Cl.
CPC ........... *H04W 12/12* (2013.01); *H04W 48/02* (2013.01); *H04W 64/003* (2013.01); *H04W 84/042* (2013.01)

(58) Field of Classification Search
CPC .. H04L 63/1425; H04L 63/101; H04W 12/02; H04W 12/12; H04W 36/0094;
(Continued)

(56) References Cited

U.S. PATENT DOCUMENTS 7,039,406 B2 * 5/2006 Ishiguro ............... H04L 1/0001
455/437
8,565,753 B2 * 10/2013 Hamabe ............... H04W 24/10
455/423

(Continued)

OTHER PUBLICATIONS

Jover, Roger P., "LTE security and protocol exploits", ShmooCon, Jan. 2016, 47 pages.
(Continued)

*Primary Examiner* — Jung Liu
(74) *Attorney, Agent, or Firm* — Guntin & Gust, PLC; Ralph Trementozzi

(57) ABSTRACT

Aspects of the subject disclosure may include, for example, obtaining a preliminary transmission received from a first wireless access terminal of a wireless network, at a mobile terminal, wherein the obtaining of the preliminary transmission occurs before a successful completion of an attachment process between the mobile terminal and the first wireless access terminal, and wherein access to a network resource by the mobile terminal via the wireless network requires a successful completion of the attachment process. A physical relationship is determined between the mobile terminal and the first wireless access terminal according to the preliminary transmission, resulting in a determined physical relationship. The determined physical relationship is compared to a predetermined threshold value to obtain a comparison result and successful completion of the attachment process is prevented based on the comparison result indicating a suspect condition. Other embodiments are disclosed.

20 Claims, 11 Drawing Sheets

(51) Int. Cl.
*H04W 48/02* (2009.01)
*H04W 84/04* (2009.01)

(58) Field of Classification Search
CPC ... H04W 36/08; H04W 48/02; H04W 84/042;
H04W 12/0017; H04W 12/1204; H04W
12/1206; H04W 12/1202; H04W
12/00524; H04W 48/20; H04W 12/0804;
H04W 8/183
See application file for complete search history.

(56) References Cited

U.S. PATENT DOCUMENTS

| | | | | |
|---|---|---|---|---|
| 9,307,476 | B2* | 4/2016 | Peng | H04W 36/0083 |
| 9,648,651 | B2* | 5/2017 | Edge | H04L 65/1016 |
| 9,826,411 | B2* | 11/2017 | Pérez | H04W 36/22 |
| 10,129,283 | B1* | 11/2018 | Briggs | H04W 12/126 |
| 10,194,272 | B2* | 1/2019 | Venkatraman | H04W 8/005 |
| 11,096,070 | B2* | 8/2021 | Venkatraman | H04L 47/29 |
| 2005/0259663 | A1* | 11/2005 | Ode | H04W 36/02 370/395.4 |
| 2006/0123133 | A1* | 6/2006 | Hrastar | H04L 63/1491 709/240 |
| 2008/0049702 | A1* | 2/2008 | Meylan | H04W 12/084 370/342 |
| 2012/0032854 | A1* | 2/2012 | Bull | G01S 19/21 342/450 |
| 2012/0256789 | A1* | 10/2012 | Bull | G01S 5/0221 342/450 |
| 2014/0334389 | A1* | 11/2014 | Abdel-Samad | H04W 74/004 370/328 |
| 2016/0135247 | A1 | 5/2016 | Ozturk et al. | |
| 2017/0295489 | A1 | 10/2017 | Agiwal et al. | |
| 2017/0331827 | A1* | 11/2017 | Salyers | H04W 12/64 |
| 2018/0359643 | A1 | 12/2018 | Park et al. | |
| 2019/0261197 | A1* | 8/2019 | Bellamkonda | H04W 16/18 |
| 2021/0044979 | A1 | 2/2021 | Vivanco et al. | |

OTHER PUBLICATIONS

Lichtman, M. et al., "Vulnerability of LTE to hostile interference", GlobalSIP, 2013 IEEE, Dec. 2013, 5 pages.

Lin, Huang , "LTE Redirection Attack—Forcing Targeted LTE Cellphone into Unsafe Network", Unicorn Team—Radio and Hardware Security Research, May 2016, 30 pages.

Reed, J. H. et al., "Comments of Wireless @ Virginia Tech in the matter of NTIA development of the nationwide interoperable Public Safety broadband network", Virginia Tech, Blacksburg, VA, Nov. 2012, 8 pages.

Shaik, Altaf et al., "Practical Attacks Against Privacy and Availability in 4G/LTE Mobile Communication Systems", Aug. 2017, 16 pages.

Vivanco, Daniel et al., "Methodology for Overcoming LTE Signal Spoofing Attacks", Feb. 15, 2019, 7 pages.

* cited by examiner

*PRIOR ART*

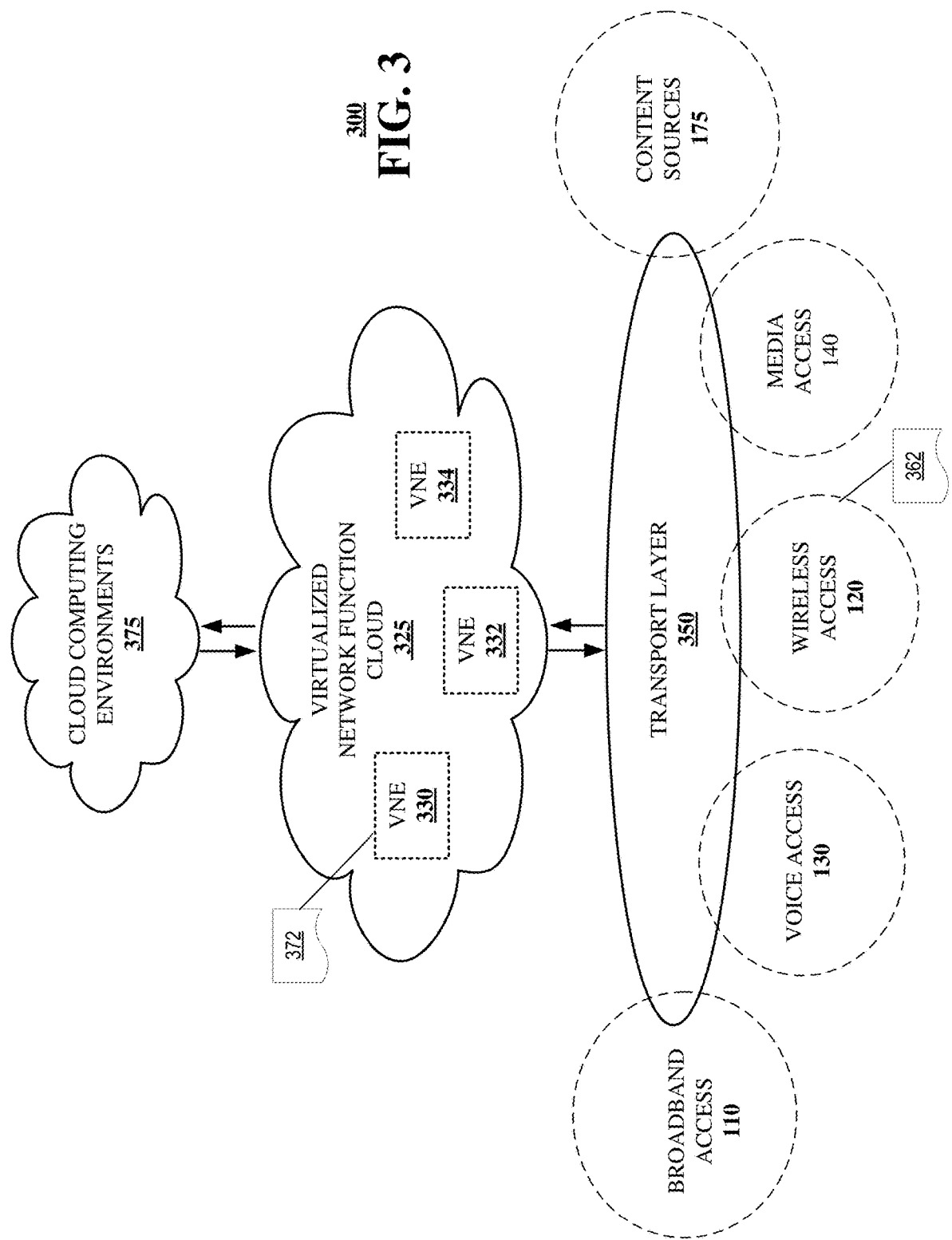

SYSTEM AND METHOD FOR AVOIDING SIGNAL SPOOFING ATTACKS IN WIRELESS BROADBAND NETWORKS

CROSS-REFERENCE TO RELATED APPLICATIONS

This application is a continuation of prior U.S. application Ser. No. 16/534,251, filed Aug. 7, 2019. All sections of the aforementioned application(s) and/or patent(s) are incorporated herein by reference in their entirety.

FIELD OF THE DISCLOSURE

The subject disclosure relates to a system and method for avoiding signal spoofing attacks in wireless broadband networks.

BACKGROUND

In wireless communications a random access procedure may be used to assign dedicated radio resources to a mobile device. A dedicated radio resource may be, for example, a specific preamble or physical random access channel (PRACH) resource. The random access procedure may be either contention-free or contention-based, and may include the following features: preamble transmission; random access response (RAR) reception, in which the RAR contains a grant for an uplink (UL) transmission; transmission of message3 (msg3) for contention-based random access; and contention resolution for contention-based random access (for example, the mobile device may determine whether the random access (RA) procedure was successfully completed).

In a random access procedure including a mobile device and an evolved Node-B (eNB), the mobile device transmits a random access preamble. Then, the eNB responds with a random access response (RAR). Next, the mobile device may transmit a scheduled transmission. Then, the eNB may perform contention resolution for contention-based random access and the mobile device may determine whether the random access procedure was successful.

A mobile device may initiate a random access procedure when one of the following events occurs: initial access to the network when the mobile device has no established connection, that is from the radio resource control (RRC)_IDLE state; a RRC connection re-establishment procedure, random access-physical downlink control channel (RA-PDCCH) order; handover; downlink (DL) data arrival during RRC_CONNECTED state requiring a random access procedure; or UL data arrival during RRC_CONNECTED state requiring a random access procedure, known as a random access scheduling request, (RA-SR).

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
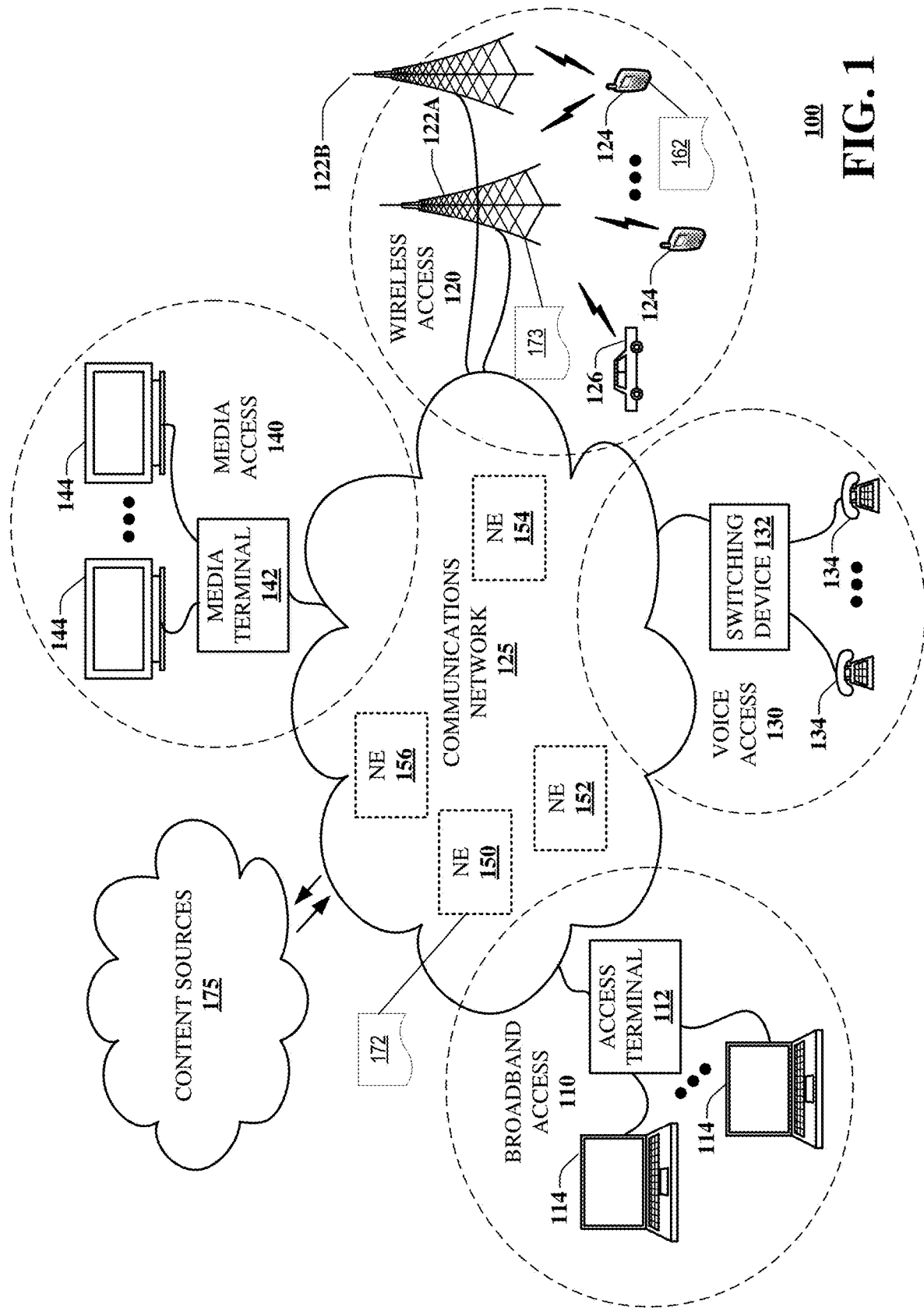
FIG. 1 is a block diagram illustrating an exemplary, non-limiting embodiment of a communications network in accordance with various aspects described herein.

The subject disclosure describes, among other things, illustrative embodiments for determining a physical relationship between a mobile terminal and a first wireless access terminal according to a preliminary transmission between the two, comparing the relationship to a predetermined threshold and preventing successful completion of an attachment process responsive to the comparison result indicating a suspect condition. Other embodiments are described in the subject disclosure.

One or more aspects of the subject disclosure include a method that includes receiving, by a processing system including a processor of a mobile device, a preliminary transmission from a first wireless access terminal of a mobile cellular network. The preliminary transmission is received before a successful completion of an attachment process between the mobile device and the first wireless access terminal, wherein access to a network resource by the mobile device via the mobile cellular network requires the successful completion of the attachment process. A physical relationship between the mobile device and the first wireless access terminal is determined, by the processing system, according to the preliminary transmission to obtain a determined physical relationship. The determined physical relationship is compared, by the processing system, to a predetermined threshold value to obtain a comparison result, and the successful completion of the attachment process is prevented, by the processing system, based on the comparison result indicating a suspect condition.

One or more aspects of the subject disclosure include a mobile device that includes a processing system having a processor and a memory that stores executable instructions. The instructions, when executed by the processing system, facilitate performance of operations that include receiving a preliminary transmission from a first wireless access terminal of a mobile network, wherein the receiving of the preliminary transmission occurs before a successful completion of an attachment process between the mobile device and the first wireless access terminal. Access to a network resource by the mobile device via the mobile network requires a successful completion of the attachment process. A physical relationship is determined between the mobile device and the first wireless access terminal according to the preliminary transmission, resulting in a determined physical relationship. The determined physical relationship is compared to a predetermined threshold value to obtain a comparison result, and successful completion of the attachment process is prevented based on the comparison result indicating an invalidating condition.

One or more aspects of the subject disclosure include a method that includes facilitating, by a processing system including a processor, establishment of an air interface layer according to a radio resource control protocol, between a mobile device and a first wireless access terminal of a mobile network service. An inquiry is received, by the processing system, from the mobile device via the air interface layer, the inquiry requesting validation of a second wireless access terminal. The inquiry results from a rogue access terminal identification process based upon initiated by the mobile device responsive to a physical relationship between the mobile device and the second wireless access terminal determined according to a prior attempted attachment between the mobile device and the second wireless access terminal. Indicia of the second wireless access terminal are determined by the processing system, based on the inquiry, and a validity status of the second wireless access terminal is determined by the processing system, based on the indicia of the second wireless access terminal. The validity status to the mobile terminal is provided by the processing system, the via the air interface.

One or more aspects of the subject disclosure include a non-transitory, machine-readable medium that includes executable instructions. The instructions, when executed by a processing system including a processor, facilitate performance of operations that include obtaining a preliminary transmission received from a first wireless access terminal of a wireless network, at a mobile terminal, wherein the obtaining of the preliminary transmission occurs before a successful completion of an attachment process between the mobile terminal and the first wireless access terminal. Access to a network resource by the mobile terminal via the wireless network requires a successful completion of the attachment process. A physical relationship is determined between the mobile terminal and the first wireless access terminal according to the preliminary transmission, resulting in a determined physical relationship. The determined physical relationship is compared to a predetermined threshold value to obtain a comparison result, and a successful completion of the attachment process is prevented based on the comparison result indicating a suspect condition.

LTE vulnerabilities to spoofing attacks have been documented in the past. LTE spoofing attacks refer to techniques that involve sending messages over the air to one or many user equipment (UE), impersonating a real LTE-cell. Messages sent to the UE(s) are meant to exercise certain UE LTE protocol stack processing. For example, LTE spoofing attacks may induce a UE to attach to a fake, i.e., rogue, eNB, which impersonates a real LTE-cell in the network. The rogue eNB can be programmed with the credentials of the real network that is being impersonated, e.g., PLMNID, FreqBand.

Under an assumption that any rogue eNB located close enough to the UE, e.g., providing a strong signal at the UE, will increase a likelihood that the UE will attempt to attach to it. For example, the rogue eNB accepts a UE RRC request and passes through all the steps of an initial cell selection and attach process. It is conceivable that such a rogue can be programed to perform specific attacks to any UE(s) that are unfortunate enough to attach to it. Without limitation, such attacks can include one or more of denial of services, UE interrogation, UE geolocation leaking, UE downgrade, e.g., 4G to 3G, and the like.

LTE spoofing attacks may cause significantly impact on the performance of the network. Attacker may use these techniques for denial of services, UE interrogation, UE geolocation leaking, UE downgrade (4G→3G), hacking into the phone/Network, etc. LTE spoofing attacks by means of rogue eNB (as described in this document) are invisible to the Wireless operator. During the attack, UE disappear from the network. Existing LTE standards do not take into consideration the presence of a rogue eNB during the Initial Cell Selection and Attach Process. Therefore extra level of security is needed.

Referring now to FIG. 1, a block diagram is shown illustrating an example, non-limiting embodiment of a communications network 100 in accordance with various aspects described herein. For example, communications network 100, including broadband wireless network elements, can facilitate in whole or in part detection and/or prevention of potential eNB spoofing situations, e.g., in which a rogue eNB entices a nearby wireless communication device to attach to it according to protocols of the broadband wireless network. In this regard, a wireless device can be equipped with means to determine or otherwise estimate a physical relationship, such as a distance, a displacement, a relative speed or velocity, between itself and any eNB to which it might otherwise use to access network resources via an air link between the wireless device and the eNB. In at least some embodiments, the wireless device is adapted to interrupt, pause, terminate or otherwise abort any attachment attempt before achieving a successful attachment. By not allowing the attachment to complete successfully, the wireless device is shielded from possible malicious attacks of a rogue eNB.

The communications network 100 can be further adapted to facilitate a validation process in which a potentially rogue eNB can be evaluated in response to an attachment request having been initially prevented. The evaluation might conclude that the potentially rogue eNB is a valid asset, e.g., based on one or more of an approximate location, a frequency of operation, a power level, historical records of past attempts, and the like. The evaluation might also conclude that the eNB cannot be validated. In such instances, attributes of the eNB and/or the attempted attachment can be associated with an unvalidated eNB. Such associations can result in unvalidated eNBs being blocked.

In particular, a communications network 125 is presented for providing broadband access 110 to a plurality of data terminals 114 via access terminal 112, wireless access 120 to a plurality of mobile devices 124 and vehicle 126 via base station or wireless access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

For example, virtualized communication network 100 can facilitate in whole or in part determining a physical relationship between a mobile terminal and a first wireless access terminal according to a preliminary transmission occurring before a successful completion of an attachment process between the mobile terminal and the first wireless access terminal. The physical relationship is compared to a predetermined threshold value and successful completion of the attachment process is prevented in response on the comparison result indicating a suspect condition, such as a separation distance below a distance threshold, or a relative displacement above a displacement threshold. The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

The systems, processes and software disclosed herein are adapted to detect and mitigate wireless broadband spoofing attacks, such as the examples provided by means of a rogue eNB. At least a first portion of an LTE spoof-avoidance algorithm 162 can be installed at the mobile devices 124. In at least some embodiments, at least a second portion of the spoof-avoidance algorithm 173 can be installed at the base station or wireless access point 122A. Alternatively or in addition, at least a third portion of the spoof-avoidance algorithm 172 can be installed within equipment, such as a network element 150, associated with a mobility core network. According to the illustrative embodiment, the wireless access 120 includes LTE-RAN access, in which the wireless access point can be an eNB, and the network element 150 can be a mobility management entity (MME).

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
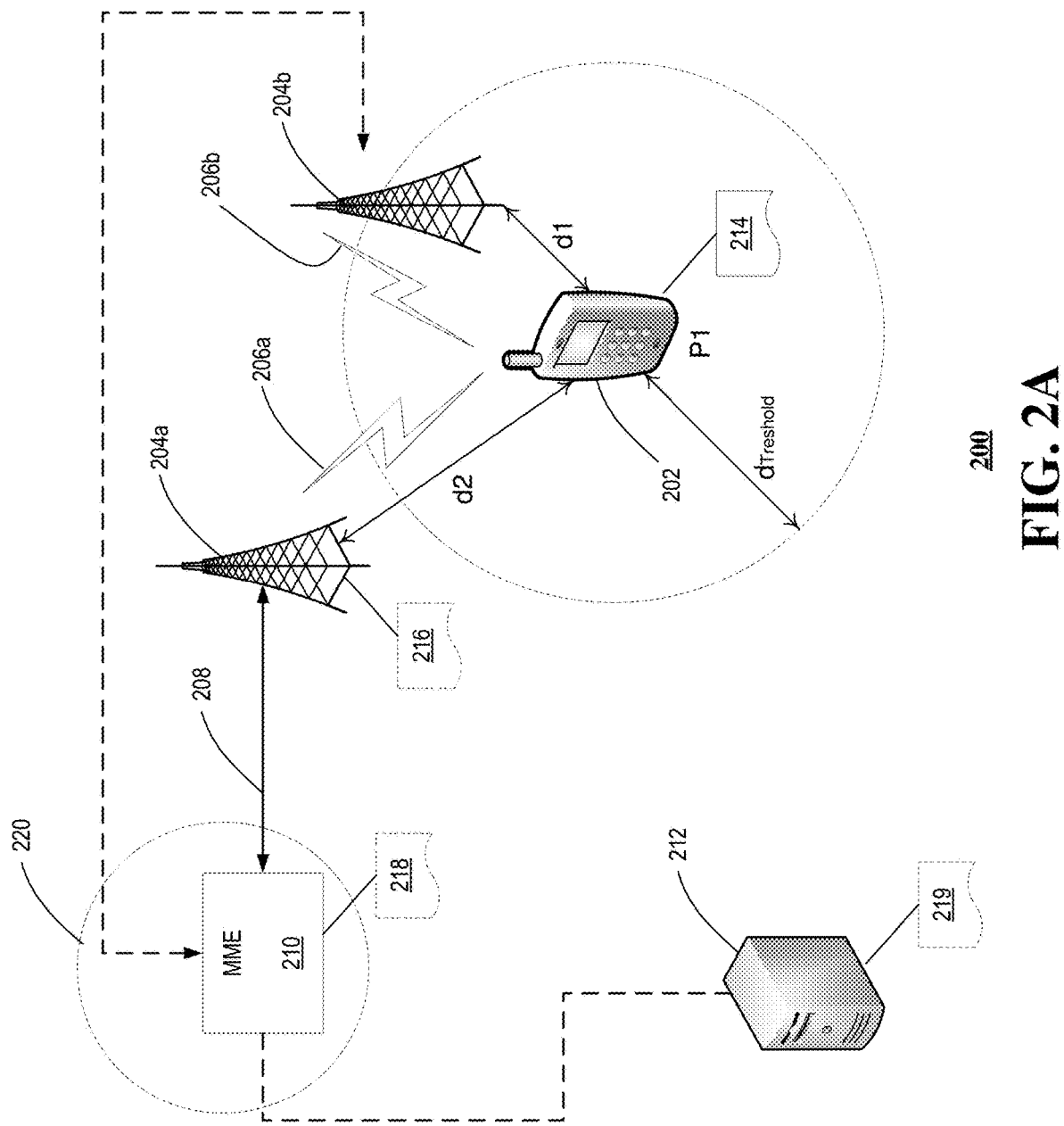
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a communication system 200 functioning within the communication network 100 of FIG. 1 in accordance with various aspects described herein. The system 200 includes a wireless communication device 202. It is understood that the wireless communication device 202 can be mobile or stationary. For example, the wireless communication device 202 can include a portable device, such as a mobile phone, a tablet device, a laptop computer, and the like. Alternatively or in addition, the wireless communication device 202 can be stationary, e.g., a home and/or other facility network enabled device, such as a home alarm sensor and/or other smart-home devices, such as smart thermostats, lighting sensors, entry controls, video and/or monitoring systems, and the like. More generally, the wireless communication device can include devices adapted for machine-to-machine (M2M), or machine-type communications, e.g., according to a concept commonly referred to as the Internet of Things (IoT).

The system 200 includes a first wireless access terminal 204a, e.g., an eNB 204a in communication with a mobility core network 220 via a backhaul communication link 208. A particular configuration of the mobility core network 220 will depend upon various factors, such as the mobile technology supported, e.g., 3G, 4G, LTE, LTE-Advanced, 5G. In some instances, the mobility core network 220 supports multiple types of mobile technologies, e.g., to accommodate capabilities of different types of mobile user equipment, and/or during periods of transition in which new network technologies are introduced into the mobile carrier network. According to the illustrative example, the mobility core network 220 includes a mobility management network element, such as an MME 210. In at least some embodiments, the mobility core network 220, e.g., the MME 210, is in further communication with another server 212 adapted to participate in protecting the wireless or mobile device 202 from spoofing attack of a rogue eNB.

Continuing with the illustrative example, the mobile device 202, when in an unattached state, discovers one or more eNBs 204a, 204b, generally 204, within communication range. In at least some embodiments, this discovery can be accomplished according to well understood techniques, e.g., in which the eNBs 204 broadcast signals on a broadcast channel monitored by the mobile device 202. The mobile device 202 can evaluate such broadcasts to determine which eNB 204 it should attempt to attach to, in order to access mobile network resources, including access to network services, such as voice, messaging, streaming media, e.g., audio and/or video, data, e-commerce, the World Wide Web, the Internet, and so on.

In at least some instances the mobile device 202 selects from among multiple eNBs 204 according to a received signal strength associated with the eNBs broadcast message. A strong downlink signal from the eNB 204 can suggest that the mobile device 202 is relatively close to the eNB 204, which would suggest that any uplink transmissions from the mobile device 202 could be accomplished at lower power levels, thereby conserving power at the mobile device and/or interference to other users of a shared radio spectrum. In this example, the mobile device 202 receives a first downlink broadcast message from a first eNB 204b via a first wireless channel 206b. The mobile device 202 is configured with anti-spoofing functionality 214 adapted to determine a physical relationship between the mobile device 202 and the broadcasting eNB 204b. Without limitation, the physical relationship can include one or more of a separation distance, a relative displacement, speed and/or velocity, an elevational distance, and/or a bearing or direction. In at least some embodiments, the anti-spoofing functionality evaluates the physical relationship with a predetermined value, e.g., compares the physical relationship with a threshold value. The anti-spoofing functionality 214 is further adapted to infer whether the broadcasting eNB 204b is a potential rogue eNB based on the evaluation.

For example, the mobile device 202, in an LTE network environment, starts an initial cell selection and attach process and selects the strongest cell from its list of allowed cells (this is part of traditional LTE). The anti-spoofing functionality 214 at the mobile device 202 monitors a preliminary message exchange between the eNB 204b and the mobile device 202 during the initial cell selection and attach process. The anti-spoofing functionality 214 determines or otherwise extracts information from the preliminary message exchange. In some instances, the extracted information can include identifying information such as physical cell identifier (PCI) of the eNB 204b. Alternatively or in addition, the extracted information can include timing information. Timing information can include, without limitation, a phase delay, a synchronization offset, a propagation delay, and the like. In an LTE context, the timing information can include a timing advance (TA) values. The mobile device 202 obtains the TA value from the cell selection and attach process. Generally speaking, the TA value corresponds to the length of time a signal takes to reach the base station from a mobile phone, and can be used by the mobile device 202 to adjust subsequent transmissions according to the TA value, such that the messages arrive at the eNB 204b with a prescribed synchronization according to channel assignments.

The anti-spoofing functionality 214 at the mobile device 202 is adapted to determine or otherwise estimate a distance between the mobile device 202 and the eNB 204b according to the TA value. It is well understood that a distance, e.g., a radio line of sight distance, can be derived from an inverse of a "propagation time" of the radio signal multiplied by its velocity, e.g., approximated by the speed of light in a vacuum. According to the illustrative example, the anti-spoofing functionality 214 determines or otherwise estimates a separation distance of $d_1$ between the mobile device 202 and the eNB 204b. Also shown is a threshold distance $d_{Threshold}$ drawn as a dashed circle about the mobile device 202. Alternatively or in addition, the anti-spoofing functionality 214 compares the TA value with a time threshold, without necessarily having to convert to a distance. The time threshold can be indicative of the threshold distance, e.g., by dividing the threshold distance by the speed of light.

According to the illustrative example, if the determined distance is smaller than the threshold distance, $d_1 < d_{Threshold}$, then the anti-spoofing functionality 214 can infer that the serving cell, or eNB 204b, is a possible rogue eNB. In at least some embodiments, the particular threshold distance $d_{Threshold}$ can be a predetermined value, e.g., 20 feet, 50 feet, 100 feet. In response to determining the separation distance is less than the threshold distance, the anti-spoofing functionality 214 is adapted to break or otherwise prevent completion of the initial cell selection and attach process. Prevention can include, without limitation, termination of the process, suspension of the process, and/or aborting the process. In at least some embodiments, the prevention can be implemented immediately, in that no further message are exchanged with the eNB 204b.

In at least some embodiments, the anti-spoofing functionality 214 at the mobile device 202 is adapted to create or otherwise update a record identifying the selected eNB 204b as a potentially rogue cell site, responsive to an intentional termination of a cell selection and attach process. For example, the anti-spoofing functionality 214 can be adapted to request that the mobile device 202 associate the selected eNB 204b with a forbidden or blocked cell list. Such a list can including cells that may be temporarily blocked, e.g., as a "possible rogue eNB" until further analysis and/or investigation can be performed to further conclude a validity and/or invalidity of the cell. Any blocked and/or possible rogue eNBs can be identified by one or more of a cell identity, a PCI, an evolved cell global identifier (ECGI), a frequency band, a public land mobile network identifier (PLMNID), and the like.

In at least some embodiments, the anti-spoofing functionality 214 at the mobile device 202 the creating or otherwise updating of a record identifying the selected eNB 204b as a potentially rogue cell site includes location information. The location information can include, without limitation, a location of the mobile device 202, e.g., its GPS location, at or about the time of the aborted cell selection and attachment process. Alternatively or in addition, the location information can include the threshold distance in association with the location of the mobile device 202 to include a region or area. To the extent additional information, such as bearing, direct, elevation, etc., are available, they can be further associated with the location of the mobile device 202 to obtain a more precise estimation of a location of the potentially rogue eNB. In at least some embodiments, the identifying record can include an association of the location information with one or more of the aforementioned cell identifying information, e.g., PCI.

As the mobile device 202 enters an initial cell selection and attach process again, the mobile device 202 chooses the strongest cell from its list of allowed cells, namely, not considering any blocked, forbidden or otherwise potentially rogue cells, such as the cell 204b selected in the previous steps. Continuing with the illustrative example, the mobile device selects the second eNB 204a and initiates a cell selection and attachment procedure via a second wireless channel 206a. The anti-spoofing functionality 214 at the mobile device 202 repeats the aforementioned process to determine whether the second eNB 204a might also be a potentially rogue eNB. In this instance, the separation distance between the mobile device 202 and the second eNB 204a is $d_2$. A comparison of the second separation distance to the distance threshold indicates that $d_2$ is above the threshold value, i.e., $d_2 > d_{Threshold}$. Once again, a similar result can be obtained by comparing the TA value obtained from the second eNB 204a to a TA threshold value. Consequently, the anti-spoofing functionality 214 at the mobile device 202 does not intervene, allowing the mobile device 202 to complete the initial cell selection and attach process with the serving cell. Had the mobile device 202 initially attempted to attach to the second eNB 204a, the initial cell selection and attach process, likewise, would have been allowed to complete, e.g., without taking any particular note of the first eNB 204b.

In some embodiments, once the mobile device 202 has attached to the second serving cell 204a and connected to a network resource, e.g., at or via the mobility core network 220, the anti-spoofing functionality 214 at the mobile device 202 sends a message to a counterpart algorithm, such as access-terminal anti-spoofing functionality 216 (shown in phantom) resident at a suitably configured eNB 204a, and/or carrier network anti-spoofing functionality 218 (shown in phantom) can be resident at a suitably configured network asset, such as the example MME 210. Alternatively or in addition, network anti-spoofing functionality 219 (shown in phantom) can be resident at a suitably configured remote asset, such as a remote server, in communication with one or more of the eNB 204a or the network asset, i.e., the MME 210.

The access-terminal anti-spoofing functionality 216 and/or the network anti-spoofing functionality 218, 219 receives information provided in a reporting message sent from the mobile device 202. The message can be provided upon initial attachment and provide any rogue or potentially rogue eNBs identified or otherwise identified by the anti-spoofing functionality 214 at the mobile device 202. The message can include a report, such as the aforementioned example report. Alternatively or in addition, the message can include any of the one or more identifying features disclosed above, alone or in combination, such as a cell identifier, mobile device location, estimated cell location, and the like. In at least some embodiments, the message is sent by the mobile device to its counterpart algorithm 216, 218, 219 using encryption.

In at least some embodiments, the access-terminal anti-spoofing functionality 216 and/or the network anti-spoofing functionality 218, 219 receives the reported information. In some embodiments, the mobile device 202 estimates the location of the "possible rogue eNB" based on TA value and UE location. Alternatively or in addition, the one or more of the counterpart functionalities or algorithms 216, 218, 219 determines or otherwise estimates the location of the possible rogue eNB based on the TA value and location of the mobile device 202. Having identified the possible rogue eNB, the access-terminal anti-spoofing functionality 216 and/or the network anti-spoofing functionality 218, 219 determines if the identified "possible rouge eNB" is a legal or otherwise valid eNB or not. In some instances this determination can be based network topology information, e.g., determining whether a valid eNB asset exists at the determined location. Such determination might include additional information reported by the mobile device 202, such as power level, frequency of operation. To the extent that the possible rogue eNB has been determined to be valid, the access-terminal anti-spoofing functionality 216 and/or the network anti-spoofing functionality 218, 219 is configured to initiate or otherwise generate a message indicating that the possible rogue eNB has been validated or otherwise verified. Likewise, to the extent that the possible rogue eNB cannot be verified or validated, the access-terminal anti-spoofing functionality 216 and/or the network anti-spoofing functionality 218, 219 can take no action or initiate or otherwise generate a message confirming the possible rogue eNB is not a valid eNB, i.e., it is in all likelihood a rogue eNB. In at least some embodiments, the aforementioned messages can be encrypted or otherwise secured before sending to the mobile device 202.

Algorithm @UE receives reply message, if eNB in question is confirmed NOT to be a rogue eNB. Responsive to receiving a message validating or otherwise verifying a possible rogue eNB as a valid asset, the anti-spoofing functionality 214 at the mobile device 202 can be adapted to removes the eNB from any blocked or otherwise forbidden cell list. In some embodiments, the anti-spoofing functionality 214 at the mobile device 202 associates the verified eNB as a verified asset, such that the anti-spoofing functionality 214 can be adapted, in at least some embodiments, to consult a verified asset list in response to determining a possible rogue eNB and before terminating or otherwise interrupting the cell selection and attachment process.

It is conceivable that in at least some embodiments, the mobile device 202 and/or the anti-spoofing functionality 214 can be adapted to determine or otherwise estimate one or more other physical relationships, such as an azimuthal direction or bearing, and/or an elevation. Consider a mobile device 202 with directional antenna, e.g., a dipole, an antenna array, a moveable antenna. In such embodiments, an estimate of a direction can be determined according to a configuration of the directional antenna in association with receipt of the broadcast message and/or the message exchange between the mobile device 202 and the eNB 204b. Such directional information alone or in combination with the determined separation distance can be used to determine a physical location, or at least an approximate location of the eNB 204b. The location can be determined according to geo coordinates, according to a location upon a map, and/or in reference to the mobile device 202. In at least some embodiments, the location of the eNB 204b can be determined or estimated according to the separation distance and/or any bearing or directional information referenced to a determined location of the mobile device 202, e.g., according to an onboard GPS receiver and/or inertial navigation system.

Figure 2B:
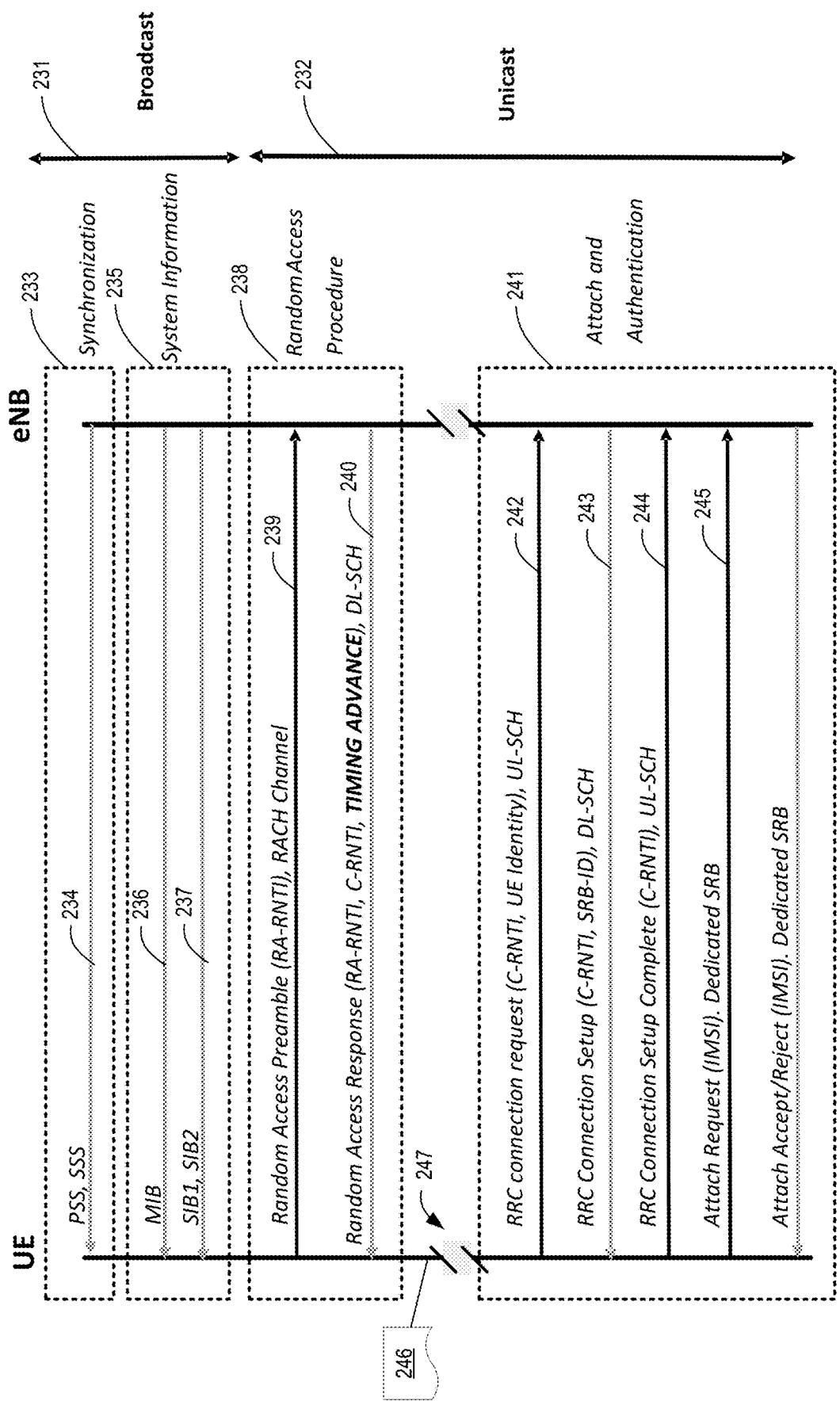
FIG. 2B is a schematic diagram illustrating an example, non-limiting embodiment of a message exchange of equipment functioning within the communication network of FIGS. 1 and 2A in accordance with various aspects described herein.

FIG. 2B is a schematic diagram illustrating an example, non-limiting embodiment of a message exchange process 230 implemented by equipment functioning within the communication network of FIGS. 1 and 2A in accordance with various aspects described herein. In particular, the message exchange process 230 relates to an example LTE cell selection and attachment process, in which messages exchanged between a UE, e.g., the mobile device 202 of FIG. 2A, and an eNB, e.g., the eNB 204 of FIG. 2A. According to the example process 230, the eNB 204b broadcasts certain information on a predetermined broadcast channel. The process 230 includes a broadcast portion 231, in which the mobile device 202 (FIG. 2A) monitors the broadcast channel to identify nearby cells 204a, 204b to which it might attempt to attach. According to the illustrative process 230, the eNB 204b broadcasts synchronization information 233, e.g., including a preliminary synchronization signal (PSS) and a secondary synchronization signal (SSS), collectively, synchronization signals, 234 within a synchronization channel (SCH). The PSS and SSS information are repeated and facilitate downlink synchronization of the mobile device 202 with the eNB 204b.

The eNB 204b also periodically broadcasts system information 235 in a downlink, e.g., including a master information block (MIB) 236, via a physical broadcast channel (PBCH). The message is broadcast periodically and includes information, such as system bandwidth, hybrid ARQ acknowledgements for ACK/NACK for uplinks, etc. The system information 235 also includes System Information Block Type 1 (SIB1) and System Information Block Type 2 (SIB2) messages 237. The SIB1 message contains information relevant when evaluating if a UE is allowed to access a cell. Also, it supplies the UE with the scheduling of other system information, broadcast on a physical downlink shared channel (PDSCH). The SIB1 message contains cell access related information (e.g., a PLMN identity list, tracking area code, cell identity, etc.), information for cell selection (e.g., minimum required receive level in the cell and offset), p-Max, frequency band indicator, scheduling information, TDD configuration, etc. The SIB2 message contains radio resource configuration information that is common for all UEs. It contains access barring information, radio resource configuration of common and shared channels, timers and constants which are used by UEs, uplink power control information, etc.

Having processed information obtained in the synchronization and system information messages 233, 235, the mobile device 202 can make a selection as to which cell of any number of available cells it intends to attach to, e.g., the eNB 204b, and initiates a random access procedure 238 with the selected eNB 204b. According to the illustrative example, the process 230 transitions to a unicast portion 232, including a random access procedure 238 and an attachment and authentication procedure 241. The mobile device 202 sends a random access preamble, according to the random access (RA) radio network temporary identifier (RNTI) (RA-RNTI) via an uplink message 239 to the eNB 204a according to random access channel (RACH). The eNB 204 responds, in turn, with a random access response 240, e.g., according to the RA-RNTI, a cell RNTI (C-RNTI) uniquely identifying the radio resource control (RRC) connection, Timing Advance (TA), and a downlink shared channel (DL-SCH).

Having selected a particular cell and obtained TA information, the mobile device 202 at a point in the message exchange 247 occurring before completion of attachment and authentication 241, applies anti-spoofing functionality 246 to evaluate whether the selected cell is a potential rogue eNB. This functionality 246 is applied to obtain a determination before concluding or otherwise completing the attachment and authentication procedure 241, in which additional messages 242, 243, 244, 245 would be exchanged between the mobile device 202 and the eNB 204b. To the extent that the anti-spoofing functionality 246 determines that the eNB 204b is a potential rogue eNB, the attachment and authentication procedure 241 can be avoided altogether, and/or terminated or otherwise aborted at any stage prior to completion. In at least some embodiments, the anti-spoofing functionality 246 is adapted to determine whether the particular eNB 204b to which the mobile device 202 is attempting to attach has been blocked and/or validated. To the extent the eNB 204b has been validated, the anti-spoofing functionality 246 can be adapted to allow the attachment and authentication procedure 241 to proceed, despite any physical relationship between the mobile device and the eNB not being satisfied.

Figure 2C:
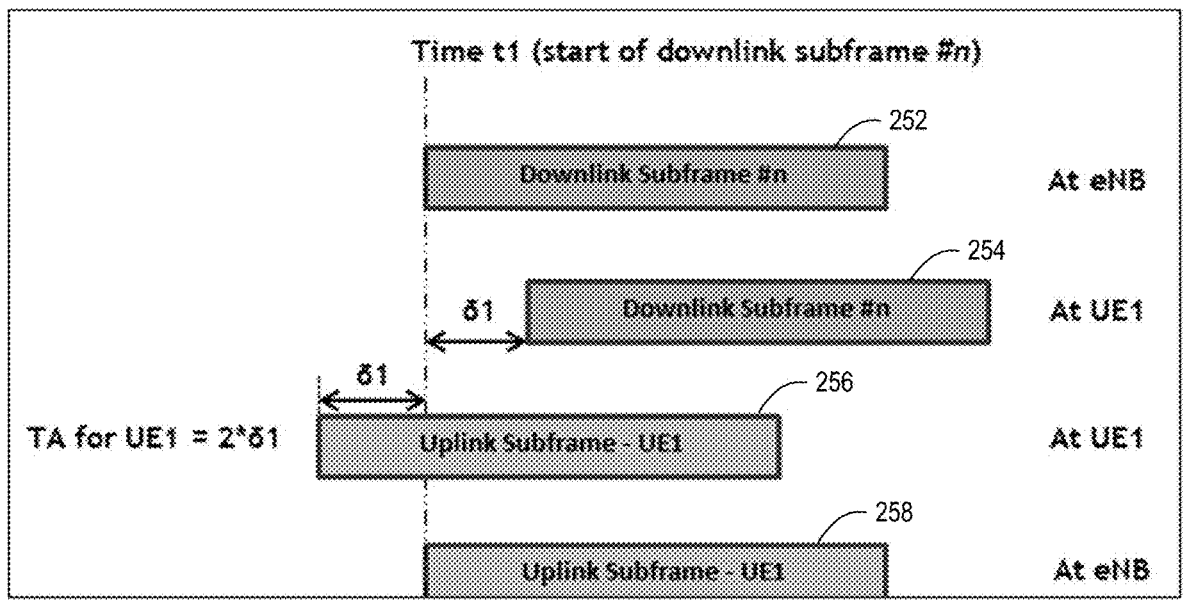
FIG. 2C is a schematic diagram illustrating an example timing diagram of messages exchanged by equipment functioning within the communication network of FIGS. 1, 2A and 2B in accordance with various aspects described herein.

FIG. 2C is a schematic diagram illustrating an example timing diagram 250 of messages exchanged by equipment functioning within the communication network of FIGS. 1, 2A and 2B in accordance with various aspects described herein. A Time Advance (TA) value corresponds to a length of time a signal takes to reach the eNB from a mobile device. The TA value can be a negative offset, at the UE, between the start of a received downlink subframe and a transmitted uplink subframe. This offset at the UE is necessary to ensure that the downlink and uplink subframes are synchronized at the eNB.

The TA value is proportional to the propagation delay between the UE and the eNB. In other words, a distance between eNB and UE can be estimated based on the TA value.

Referring to the example diagram 250, a time $t_1$ is identified as a start of a downlink subframe #n 252, determined from a perspective of an eNB. The downlink subframe #n can be received by a UE within range, to obtain a received downlink subframe #n 254. The receive downlink subframe #n 254 is illustrated from a perspective of the UE, such that it is received after a delay $\delta_1$, resulting from a propagation delay between the eNB and the UE. A TA value of $2\delta_1$ is identified and provided by the eNB to the UE. The delay value $\delta_1$, can be determined from the TA value, e.g., dividing TA by 2, to obtain a one-way propagation delay $\delta_1$. In practice, an uplink subframe 256 is sent from a perspective of the UE at with a negative offset of $\delta_1$, such that a received uplink subframe message 258, corresponding to the transmitted uplink subframe 256, is received at the eNB at time $t_1$. As disclosed herein the TA value, the offset value $\delta_1$, or a distance determined according to the TA value of the offset value $\delta_1$, can be compared to a threshold to determine a physical relationship between the UE and the eNB.

The eNB first estimates an initial TA from PRACH sent by the UE (Random Access Preamble message). The PRACH can be used as timing reference for uplink during the UE's initial access, radio link failure, during handover, etc. The eNB sends timing advance command in Random Access Response message (RAR). Once the UE is in connected mode, the eNB keeps estimating the timing advance and sends a time advance command MAC control element to the UE, if correction is required.

Figure 2D:
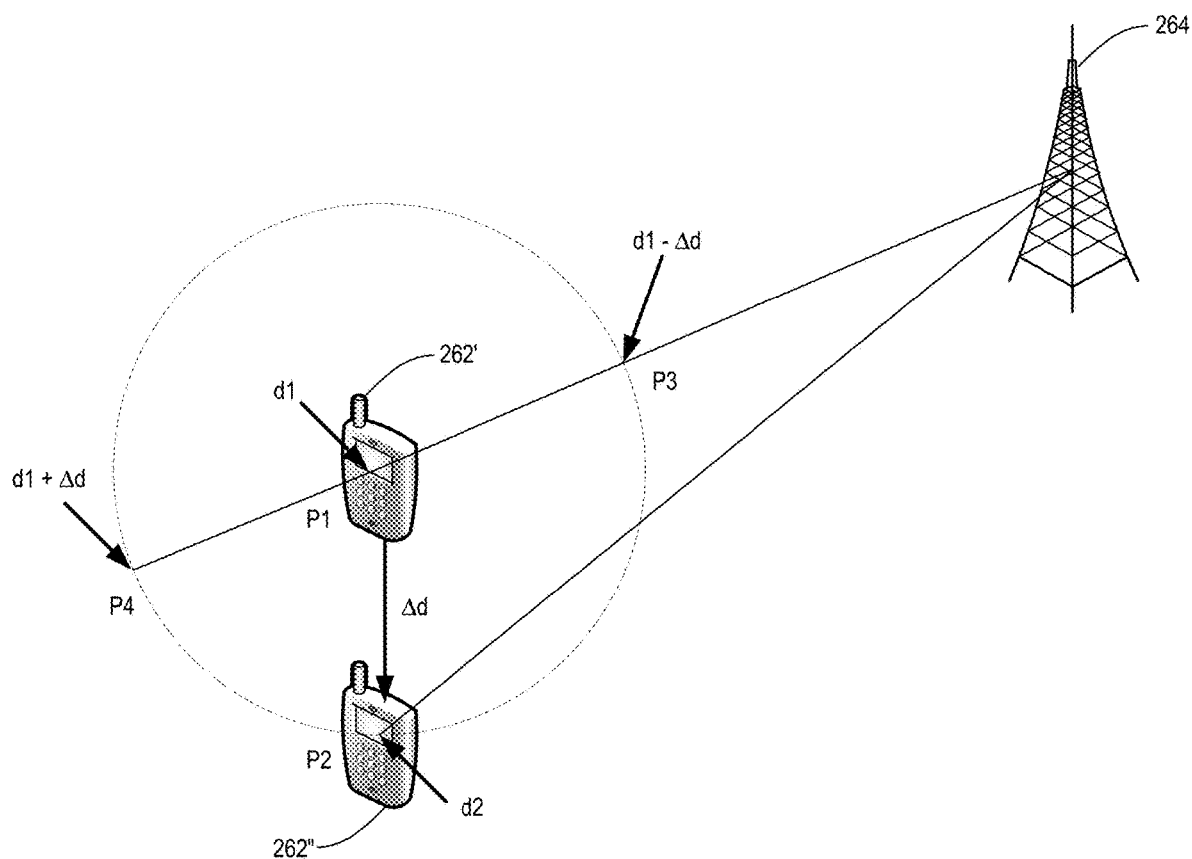
FIG. 2D is a block diagram illustrating an example, non-limiting embodiment of a system functioning within the communication network of FIGS. 1, 2A, 2B and 2C in accordance with various aspects described herein.

In the foregoing examples, the physical relationship between the mobile device and the eNB was based on radio propagation delay, physical separation distance, direction, bearing and/or elevation. Without limitation, the physical relationship can include other attributes, such as displacement, speed and/or velocity. FIG. 2D is a block diagram illustrating an example, non-limiting embodiment of a system 260 functioning within the communication network of FIGS. 1, 2A, 2B and 2C in accordance with various aspects described herein. The system 260 observed at a first time $t_1$, includes a mobile device 262' at a first location, $P_1$. The mobile device 262' at the first location $P_1$ is separated at a distance $d_1$ from a wireless access terminal, e.g., eNB 264. The same system 260 observed at a second time $t_2$, includes the mobile device 262" at a second location, $P_2$. The mobile device 262" at the second location $P_2$ is separated at a distance $d_2$ from the eNB 264. According to the illustrative example, the mobile device 262', 262", generally 262, at the first and second positions are separated by a displacement of $\Delta d$. Such a displacement can result from movement of the mobile device 262 over time, a movement of the eNB 264 or a relative movement of both.

In some embodiments, anti-spoofing functionality can be adapted to determine a physical relationship between the mobile device and a selected eNB that is based on more than one TA values. For example, a first attempt of the cell selection and attachment procedure can be initiated at a first time $t_1$. The first attempted process can progress until the mobile device 262 is able to determine a first TA value, a first propagation delay and/or a first distance between itself and the eNB 264. The first attempted process can be aborted, terminated or otherwise paused, once the first TA value, the first propagation delay and/or the first distance is obtained. In at least some embodiments, the first attempted process is interrupted before a successful attachment and authorization is achieved regardless of the resulting TA, delay or distance values.

The process can be repeated and/or restarted at a second, later time, $t_2$, according to a second attempted process. Once again, the second attempted process can progress until the mobile device 262 is able to determine a second TA value, a second propagation delay and/or a second distance between itself and the eNB 264. The anti-spoofing functionality can be adapted to determine a displacement or delta value as a difference between any of the one or more TA, delay, or distance values obtained from the second and first attempted processes. Such displacements or deltas can be indicative of relative movement between the mobile device 262 and the eNB 264. For a network topology employing stationary cells, any relative movement between the mobile device 262 and the eNB 264 that cannot be attributed to movement of the mobile device, can be relied upon to infer that the eNB is a potential rogue eNB.

In some embodiments, the anti-spoofing functionality can be adapted to determine a first position, P1, of the mobile device 262' during the first attempted process, and a second position, P2, of the mobile device 262" during the second attempted process, e.g., a mobile device displacement of Δd. Depending upon a direction of travel of the mobile device 262 with respect to the eNB 264, the mobility mobile device 262 can account for a difference in TA, delay or distance values of no more than twice the value of Δd, i.e., 2Δd. In this manner, the value 2Δd can be used as a threshold displacement value. It is understood that the physical threshold displacement value can be converted to a corresponding threshold displacement TA value and/or a corresponding threshold displacement delay value. Accordingly, the anti-spoofing functionality can be adapted to determine the threshold displacement value and/or compare the measured displacement to the threshold displacement value. If the displacement exceeds the threshold value, the anti-spoofing functionality can proceed to identify the eNB 254 as a potential rogue eNB.

In some embodiments, the anti-spoofing functionality is adapted to adjust a first TA, delay or distance value by adding a corresponding value based on Δd for an upper limit and subtracting a corresponding value based on Δd for a lower limit. The second TA, delay and/or distance values can then be compared to the determined upper and lower limits. To the extent the second TA, delay and/or distance falls above the upper limit or below the lower limit, the eNB can be identified as a potential rogue eNB 264.

Figure 2E:
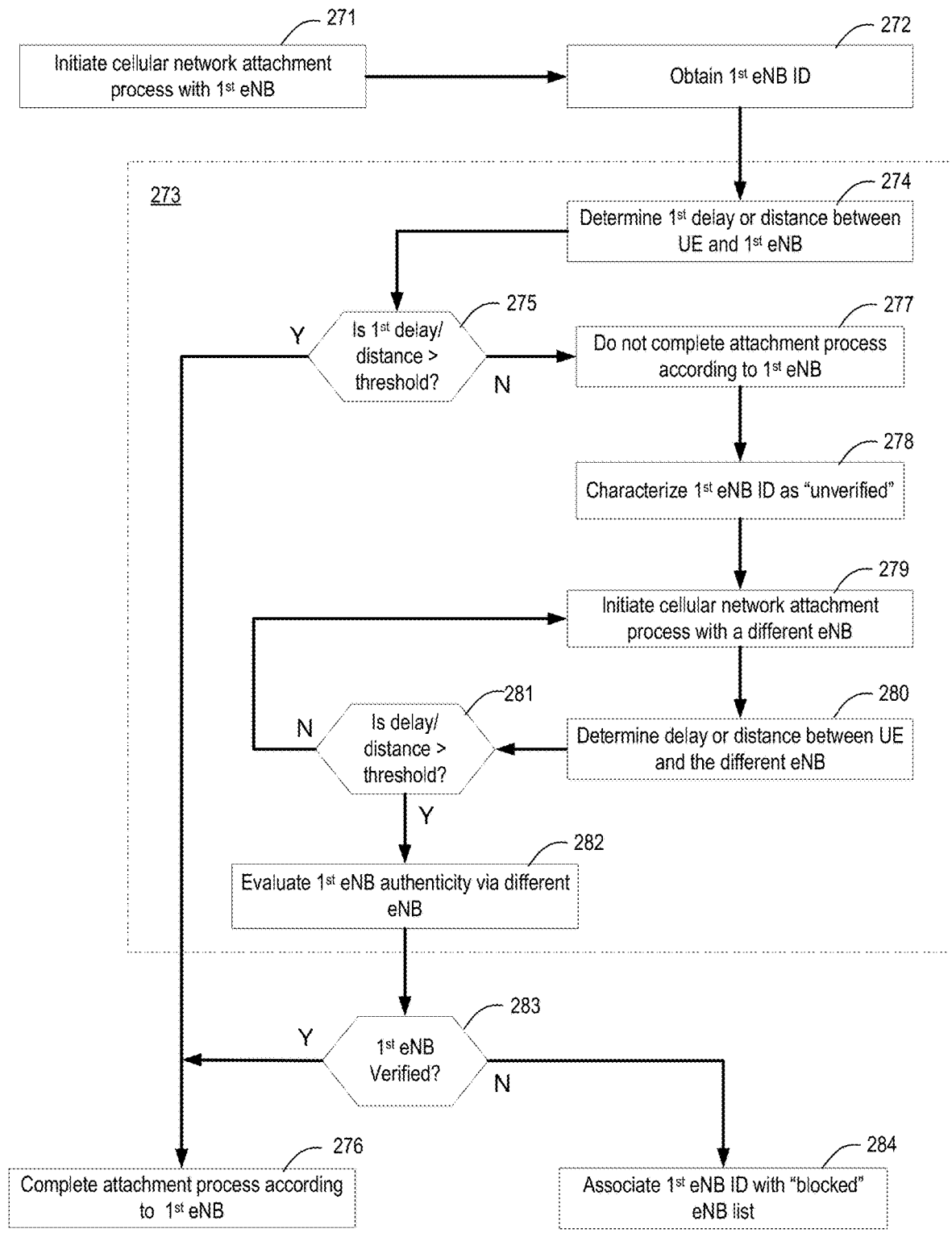
FIG. 2E depicts an illustrative embodiment of a process in accordance with various aspects described herein.

FIG. 2E depicts an illustrative embodiment of a process 270 in accordance with various aspects described herein. The process 270 is adapted to prevent UE from attaching to a potentially rogue wireless access terminal, base station or eNB. In at least some embodiments, the process 270 is further adapted to associate possible rogue eNBs with a record of unvalidated, invalid or otherwise blocked eNBs.

According to the process 270, a cell selection and attachment process is initiated at 271 between UE 202 and a first eNB 204b (FIG. 2A). In at least some embodiments, the process includes the example LTE process 230 (FIG. 2B), in which the UE obtains identifying information associated with the eNB and TA information, e.g., during a random access procedure 238.

Identifying information of the first eNB is obtained at 272. This can include, without limitation, the identifying information such as a physical cell identifier (PCI) of the eNB, PLMNID, FreqBand information as might be obtained by the LTE cell selection and attachment process 230. To the extent the eNB is a possibly rogue, there is a possibility that the obtained information are taken from a real network that is being impersonated.

A physical relationship is determined between UE and first eNB at 274. The physical relationship can include, without limitation, a distance or separation between the UE and the eNB, a time delay and/or offset of radio signal propagation between the UE and the eNB, a displacement of the UE, the eNB and/or a relative displacement between the UE and the eNB.

The determined physical relationship is compared to a predetermined parameter at 275. In at least some embodiments, the predetermined parameter is a threshold value, such that the comparison determines whether the determined physical relationship is above and/or below the threshold value. By way of example, the determined physical relationship as a distance, is compared at 275 to a threshold distance to determine whether the determined distance is above or below the threshold distance.

To the extent the $1^{st}$ delay/distance is greater than the delay/distance threshold, the process 270 proceed to complete a cell selection and attachment process to the $1^{st}$ eNB at 276.

To the extent it is determined at 275 that the comparison of the physical relationship to the predetermined parameter does not satisfy a validation criteria, the cell selection and attachment procedure is prevented from completing. Continuing with the illustrative example, if the determined distance between the UE and the eNB is not greater than a threshold distance, e.g., 20 feet, then completion of the cell selection and attachment process is prevented. This can include terminating the process, pausing the process, suspending the process, and so on.

In at least some embodiments, responsive to there being a failure to validate the first eNB at 275, the first eNB can be identified as "unverified" at 278. Identification of the first eNB as unverified can include generation and/or alternation of a record at one or more of the UE, a second eNB, a core network resource, a validation server, and the like. In at least some embodiments, the UE maintains a record of unverified, invalid or "blocked" eNBs. Such a record can be updated according to the failure to validate, such that in at least some embodiments, the UE will not attempt subsequent cell selection and attachment procedures with the first eNB. As possible rogue eNBs can use valid identifying information, generation and/or alteration of the records can include additional information, such as a location of the possibly rogue eNB, and or an association of the eNB identifying information and the location associated with the failure to validate at 275. The location can be a location of the UE at the time of the attempted cell selection and validation, and/or an estimated location or region of the possible rogue eNB based on the UE location in association with the physical relationship, such as distance or delay.

In at least some embodiments, the process 270 can continue in an attempt to redeem the possibly rogue eNB from the blocked or invalid list. It is understood that the UE may be in close proximity to a valid eNB, such that determination of the validity cannot be reliably based on location alone. According to the example process 270, the UE attempts a subsequent cell selection and attachment procedure with a different eNB at 279. For example, the different eNB can be the next best eNB, e.g., the eNB with the next highest received power level.

A determination of a physical relationship between the UE and the second eNB is accomplished at 280. In at least some embodiments, the same type of physical relationship is made, e.g., a distance or separation between the UE and the second eNB, a time delay and/or offset of radio signal propagation between the UE and the second eNB.

The determined physical relationship is compared to a predetermined parameter at 281. By way of example, the determined physical relationship as a distance, is compared at 281 to the threshold distance to determine whether the determined distance is above or below the threshold distance. It is understood that in some embodiments the same threshold can be applied to all measurements. Alternatively or in addition, different thresholds can be applied. For example, thresholds may differ according to frequency band.

To the extent it is determined at 281 that the distance is not greater that the threshold distance, the process 270 continues to initiate cellular network attachment process with yet another different eNB 279. However, to the extent it is determined at 281 that the delay/distance is greater than the threshold, the cell selection and attachment process with the different eNB can be allowed to complete, such that an authenticity of the first eNB can be determined at 282 via the different eNB. In some embodiments, one or more of steps 274 through 282 can be considered a rogue cell identification or avoidance process 273.

A further determination is made at 283 as to whether the first eNB was verified. Such verification can include, without limitation, a comparison of one or more of the UE location, the first eNB identifier, the distance and/or delay threshold, and the like. To the extent the first eNB has been verified, the process can initiate removal of the first eNB from an unverified or blocked list and/or associate the eNB with a valid, verified and/or unblocked list, such that subsequent attempts by the UE to engage in a cell selection and attachment process with the first eNB will not be interrupted, aborted, blocked or otherwise prevented. In at least some embodiments, a determination at 283 that the first eNB is not a possible rogue eNB, initiates a cell selection and reattachment attempt by the UE to gain access to the first eNB in favor of the different eNB to which the UE has attached. However, to the extent the first eNB has not been verified at 283, the first eNB ID will not be removed from any "blocked" eNB list and/or will be associated with a confirmed invalid list at 284.

It is understood that 4G/5G operators may use small cells to serve UEs in some locations, e.g., at shopping malls, and in densely populated areas, such as city centers, and the like. According to such applications, small cells may be located very close to the UEs. To differentiate valid or "legal" small cells from "possible rogue eNB" the anti-spoofing functionality, in at least some instances, may take alternate and/or additional steps:

For example, the anti-spoofing functionality, or algorithm, at the UE can force the UE to enter attempted cell-selection and attachment to the same cell multiple times, without successfully attaching, to collect several samples, e.g., several distances and/or delays.

One or more reports sent by the UE to anti-spoofing functionality, or algorithms, operating within the LTE RAN, e.g., at another eNB and/or core network element, can be used to analyze changes of the obtained TA values and/or corresponding separation distances over time. Changes of TA over time implies movement from UE and/or eNB. If this movement doesn't align with changes of UE location, then this implies the presence of a mobile eNB.

Alternatively or in addition, multiple UEs may send these or similar reports to functionality, e.g., algorithms operating with the LTE-RAN. The LTE-RAN algorithms can use the multiple reports to obtain, e.g., by triangulation, a more precise location of the location of the "possible rogue eNB," which can be used to determine if this eNB is a real eNB or not.

Figure 2F:
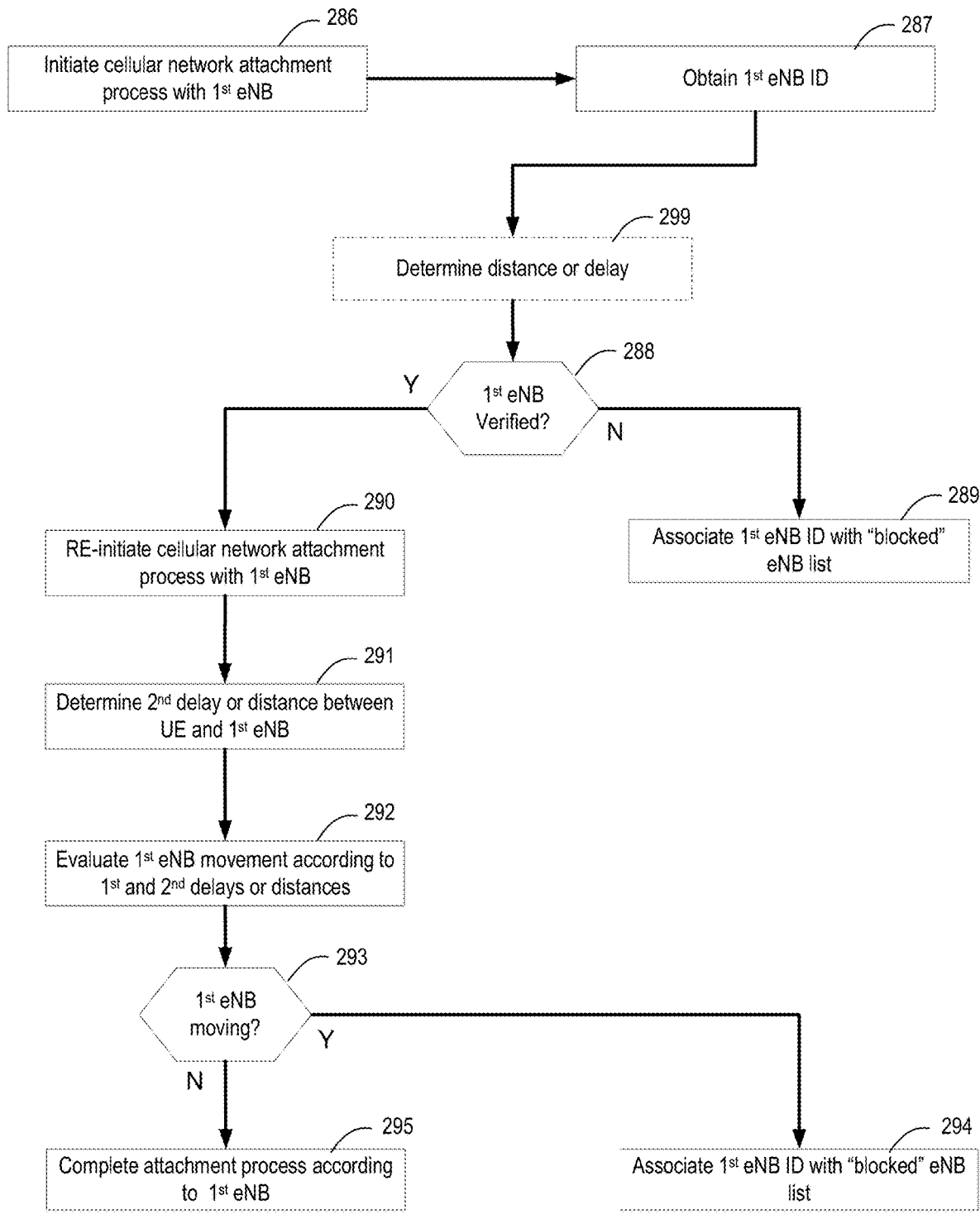
FIG. 2F depicts an illustrative embodiment of another process in accordance with various aspects described herein.

FIG. 2F depicts an illustrative embodiment of another process 285 in accordance with various aspects described herein. The process 285 is adapted to prevent a UE from attaching to a potentially rogue wireless access terminal, base station or eNB. In at least some embodiments, the process 285 is further adapted to associate possible rogue eNBs with a record of unvalidated, invalid or otherwise blocked eNBs.

According to the process 285, a cell selection and attachment process is initiated at 286 between wireless device and a first wireless access terminal. In at least some embodiments, the process includes the example LTE process 230 (FIG. 2B), in which the wireless device obtains identifying information associated with the wireless access terminal and TA information, e.g., during a random access procedure 238.

Identifying information of the first wireless access terminal is obtained at 287. This can include, without limitation, the identifying information such as a physical cell identifier (PCI) of the wireless access terminal, PLMNID, FreqBand information as might be obtained by the LTE cell selection and attachment process 230. To the extent the wireless access terminal is a possibly rogue, there is a possibility that the obtained information are taken from a real network that is being impersonated.

In at least some embodiments, a physical relationship is determined between wireless device and first wireless access terminal at 299. In some embodiments, step 299 can include one or more steps of the rogue cell identification or avoidance process 273 (FIG. 2E). A determine is made at 288 as to whether the first wireless access terminal is valid, e.g., based on the rogue cell identification or avoidance process 273.

To the extent it is determined at 288 that the first wireless access terminal is not valid, i.e., possibly rogue, the first wireless access terminal is associated at 289 with a record of invalid wireless access terminals. However, to the extent it is determined at 288 that the first wireless access terminal is not invalid, the cell selection and attachment process is re-initiated and/or restarted at 290.

A second determination of the physical relationship between the wireless device and the first wireless access terminal is accomplished at 291. The second determination is accomplished at a different time, e.g., after a time delay of a few seconds, minutes or more.

An evaluation is performed at 292 to identify any change in the physical relationship, such as a change in distance, or displacement, of one or both of the wireless device and the first wireless access terminal. A further determine is made at 293 as to whether the first wireless access terminal is moving. In at least some embodiments, the determination is based at least in part on the physical relationships, e.g., distances, obtained at different times. Movement of one or more of the wireless device or the wireless access terminal would most likely result in different values. To the extent the time delay is known between the different measurements, an estimate of a speed or velocity can be obtained. A velocity can depend at least in part on locations of the wireless device and/or the first wireless access terminal associated with determination of the physical relationships.

To the extent it is determined at 293 that the first wireless access terminal is moving, the first wireless access terminal can be associated at 294 with a record of invalid wireless access terminals. However, to the extent it is determined at 293 that the first wireless access terminal is not moving, the cell selection and attachment procedure can be permitted to complete at 295. Upon completion, the mobile device is attached to the first wireless access terminal, thereby gaining access to network resources and services via the first wireless access terminal. In some embodiments, the first wireless access terminal is associated with a record of validated wireless access terminals. Such a record can be maintained and/or otherwise accessed by one or more of the second wireless access terminal, the UE, other network elements, such as the MME 210 (FIG. 2A), and/or server 212. It is understood that records indicating that a potentially rogue wireless access terminal has been validated can be used as a shortcut to validate future inquiries as to whether a particular wireless access terminal is rogue.

While for purposes of simplicity of explanation, the respective processes are shown and described as a series of blocks in FIGS. 2E and 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 230 presented in FIGS. 1, 2A, 2B, 2C, and 3. For example, virtualized communication network 300 can facilitate in whole or in part determining a physical relationship between a mobile terminal and a first wireless access terminal according to a preliminary transmission occurring before a successful completion of an attachment process between the mobile terminal and the first wireless access terminal. The physical relationship is compared to a predetermined threshold value and successful completion of the attachment process is prevented in response on the comparison result indicating a suspect condition, such as a separation distance below a distance threshold, or a relative displacement above a displacement threshold.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
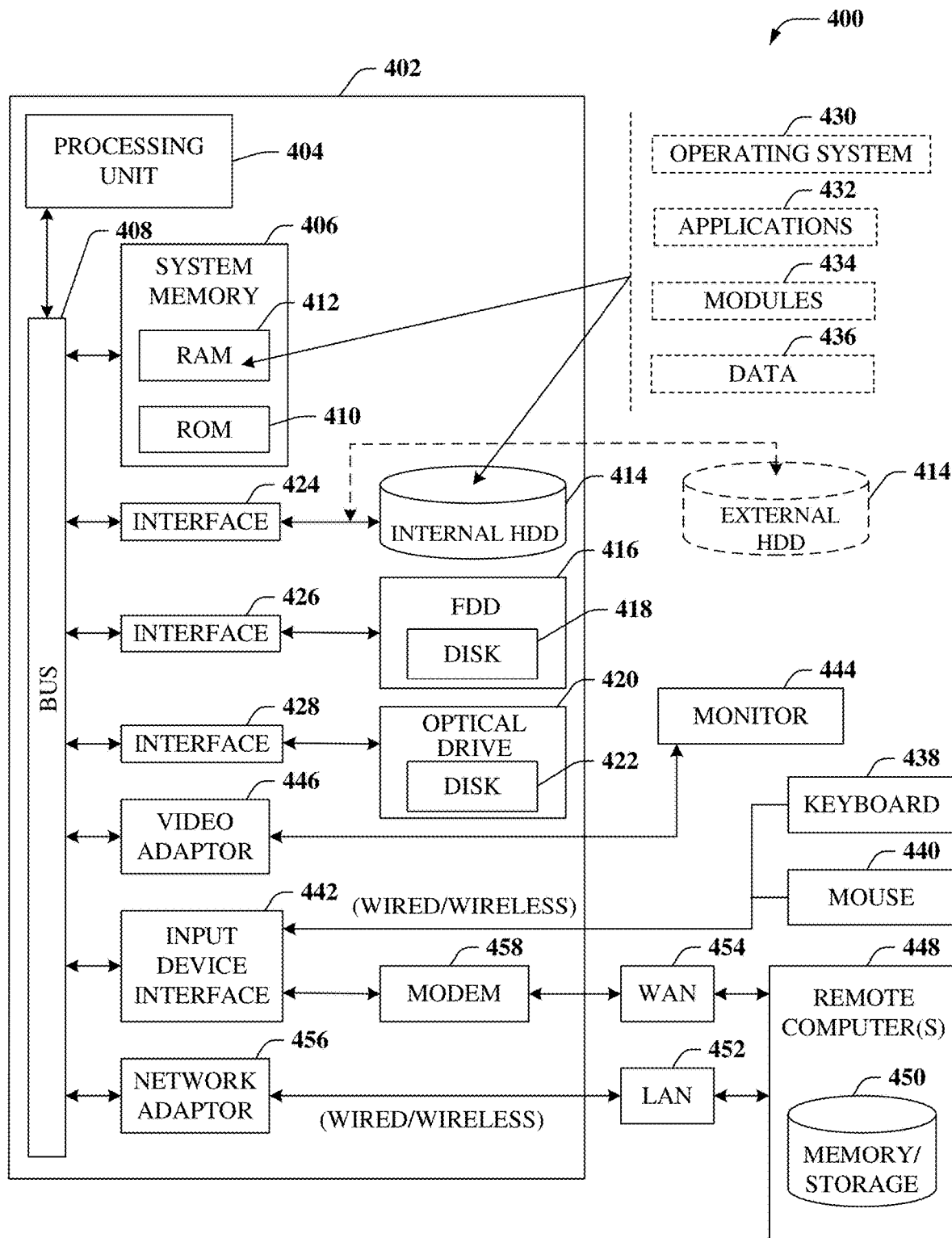
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining a physical relationship between a mobile terminal and a first wireless access terminal according to a preliminary transmission occurring before a successful completion of an attachment process between the mobile terminal and the first wireless access terminal. The physical relationship is compared to a predetermined threshold value and successful completion of the attachment process is prevented in response on the comparison result indicating a suspect condition, such as a separation distance below a distance threshold, or a relative displacement above a displacement threshold.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
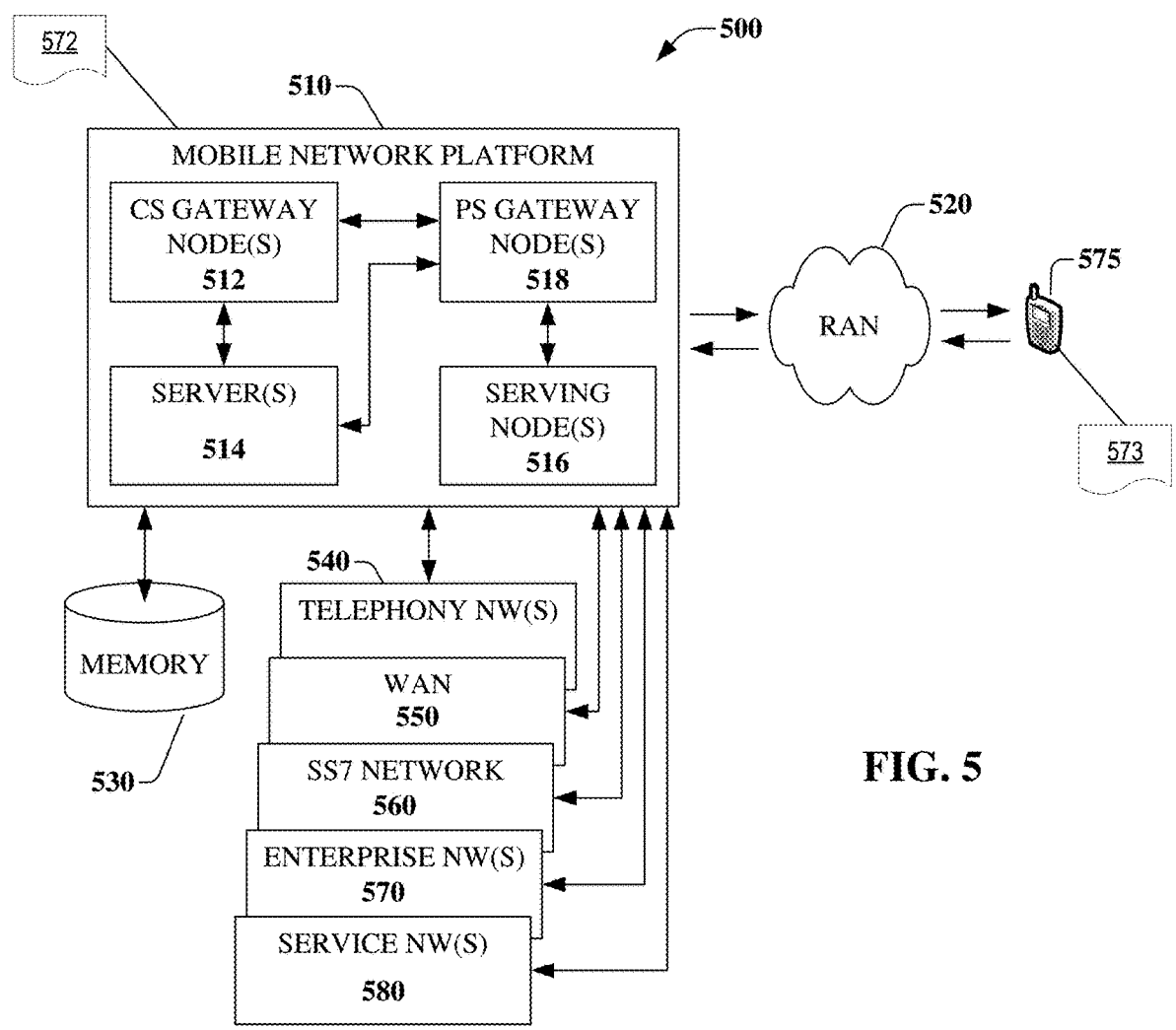
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining a physical relationship between a mobile terminal and a first wireless access terminal according to a preliminary transmission occurring before a successful completion of an attachment process between the mobile terminal and the first wireless access terminal. The physical relationship is compared to a predetermined threshold value and successful completion of the attachment process is prevented in response on the comparison result indicating a suspect condition, such as a separation distance below a distance threshold, or a relative displacement above a displacement threshold. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
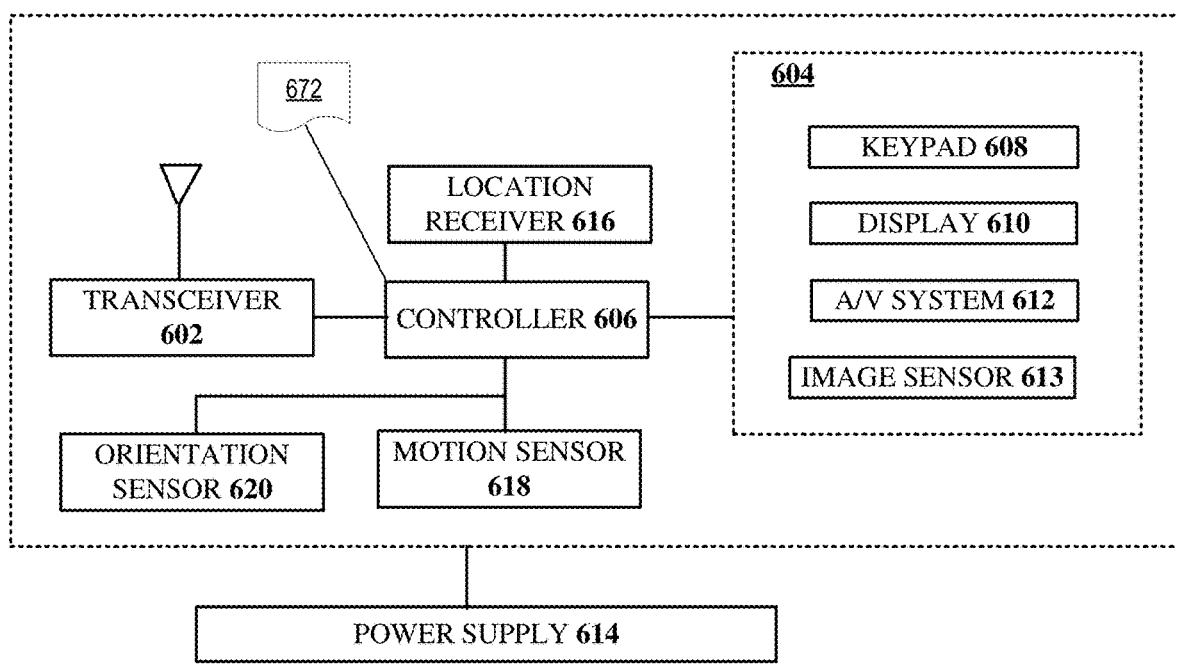
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining a physical relationship between a mobile terminal and a first wireless access terminal according to a preliminary transmission occurring before a successful completion of an attachment process between the mobile terminal and the first wireless access terminal. The physical relationship is compared to a predetermined threshold value and successful completion of the attachment process is prevented in response to the comparison result indicating a suspect condition, such as a separation distance below a distance threshold, or a relative displacement above a displacement threshold.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   determining, by a processing system including a processor of a mobile device, a timing value of a preliminary transmission from a wireless access terminal of a mobile cellular network, wherein the preliminary transmission is received before a successful completion of an attachment process between the mobile device and the wireless access terminal;
   determining, by the processing system, a displacement between the mobile device and the wireless access terminal according to the timing value;
   comparing, by the processing system, the displacement to a threshold value to obtain a comparison result; and
   preventing, by the processing system, the successful completion of the attachment process based on the comparison result indicating the displacement violates the threshold value, wherein the threshold value comprises a distance threshold.

2. The method of claim 1, wherein the preliminary transmission comprises a timing value corresponding to a wireless propagation delay between the mobile device and the wireless access terminal.

3. The method of claim 2, wherein the displacement is determined according to a first preliminary transmission comprising a first timing value and a second preliminary transmission comprising a second timing value.

4. The method of claim 3, wherein the displacement violates the displacement by being less than the threshold value.

5. The method of claim 1, further comprising:
   determining, by the processing system, an identity of the wireless access terminal; and
   associating, by the processing system, according to the identity, the wireless access terminal with a blocked wireless access terminal list responsive to the comparison result indicating the displacement violates the threshold value.

6. The method of claim 5, further comprising:
   completing, by the processing system, a different attachment process between the mobile device and another wireless access terminal to access a network resource via the another wireless access terminal;
   validating, by the processing system, the identity of the wireless access terminal via the network resource; and
   removing, by the processing system, the wireless access terminal from the blocked wireless access terminal list responsive to the determining of the validity of the wireless access terminal.

7. The method of claim 6, wherein the another wireless access terminal is in communication with a core network of the mobile cellular network.

8. The method of claim 1, wherein the mobile cellular network comprises a long term evolution (LTE) network.

9. The method of claim 8, wherein the preliminary transmission comprises a transmission of a random access procedure of the LTE network, wherein the transmission of the random access procedure comprises a timing advance value, and wherein the determining of the displacement is according to the timing advance value.

10. A mobile device, comprising:
    a processing system including a processor; and
    a memory that stores executable instructions that, when executed by the processing system, facilitate performance of operations, the operations comprising:
       determining a timing value of a preliminary transmission received from a wireless access terminal of a mobile network, wherein the determining of the timing value occurs before a successful completion of an attachment process between the mobile device and the wireless access terminal;
       determining a displacement between the mobile device and the wireless access terminal according to the timing value;
       comparing the displacement to a predetermined threshold value to obtain a comparison result; and
       preventing successful completion of the attachment process based on the comparison result indicating the displacement violates the predetermined threshold value, wherein the predetermined threshold value comprises one of a distance threshold or a change in distance threshold, and wherein the preventing of the successful completion of the attachment process is responsive to the comparison result obtained when one of the displacement being less than the distance threshold or the change in distance being greater than the change in distance threshold.

11. The mobile device of claim 10, wherein the operations further comprise:
    determining an identity of the wireless access terminal; and
    associating according to the identity, the wireless access terminal with a blocked wireless access terminal list, responsive to the comparison result obtained when the distance is less than the distance threshold.

12. The mobile device of claim 11, wherein the operations further comprise:
    associating the wireless access terminal with a blocked wireless access terminal list based on the comparison result;

completing an attachment process between the mobile device and another wireless access terminal to access a network resource via the another wireless access terminal;

determining a validity of the wireless access terminal via the network resource; and removing the wireless access terminal from the blocked wireless access terminal list responsive to the determining of the validity of the wireless access terminal, and associating the wireless access terminal with an authorized wireless access terminal list, wherein the association with the authorized wireless access terminal list permits successful completion of the attachment process according to the comparison result.

13. The mobile device of claim 10, wherein the mobile network comprises a long term evolution (LTE) network, wherein the preliminary transmission comprises a transmission of a random access procedure of the LTE network.

14. The mobile device of claim 13, wherein the transmission of the random access procedure comprises a timing advance value, and wherein the determining of the displacement is according to the timing advance value.

15. A method, comprising:
facilitating, by a processing system including a processor, establishment of an air interface layer according to a radio resource control protocol, between a mobile device and a first wireless access terminal of a mobile network service;

determining, by the processing system, indicia of a second wireless access terminal based on an inquiry received from the mobile device via the air interface layer, the inquiry requesting validation of the second wireless access terminal, wherein the indicia of the second wireless access terminal comprises an approximate location of the second wireless access terminal, the inquiry resulting from an access terminal identification process initiated responsive to a physical relationship between the mobile device and the second wireless access terminal;

determining, by the process system, a validity status of the second wireless access terminal based on the indicia of the second wireless access terminal; and providing, by the processing system, the validity status to the mobile device, wherein the physical relationship is based on a displacement between the mobile device and the first wireless access terminal, the displacement determined according to timing values of a first preliminary transmission, wherein the determining of the validity status further comprising comparing, by the processing system, the approximate location to a predetermined location of a valid wireless access terminal.

16. The method of claim 15, wherein the validity status is determined without utilizing resources of a mobility management entity of the mobile network service.

17. The method of claim 15, wherein the physical relationship comprises one of a distance between the mobile device and the second wireless access terminal, a wireless propagation delay of a message exchange between the mobile device and the second wireless access terminal, and a timing advance value obtained by the mobile device from the second wireless access terminal.

18. The method of claim 15, wherein the mobile network service comprises a long term evolution (LTE) network.

19. The method of claim 15, wherein the mobile network service comprises a long term evolution (LTE) network service according to standards of the 3rd Generation Partnership Project (3GPP) standards organization, wherein the inquiry comprises a transmission of a random access procedure of the LTE network, wherein the transmission of the random access procedure comprises a timing advance value, and wherein the determining of the physical relationship is according to the timing advance value.

20. The method of claim 18, wherein the providing, by the processing system, the validity status to the mobile device via the air interface layer occurs before the mobile device concludes an attachment process to the first wireless access terminal.

\* \* \* \* \*